(12) United States Patent
Piccione

(10) Patent No.: US 6,404,620 B1
(45) Date of Patent: Jun. 11, 2002

(54) PORTABLE ELECTRICAL DISTRIBUTING APPARATUS

(76) Inventor: Charles S. Piccione, 416 Liggett Blvd., Phillipsburg, NJ (US) 08865-4016

( * ) Notice: Subject to any disclaimer, the term of this patent is extended or adjusted under 35 U.S.C. 154(b) by 0 days.

(21) Appl. No.: 09/706,414

(22) Filed: Nov. 3, 2000

(51) Int. Cl.$^7$ .................................................. H02B 1/00
(52) U.S. Cl. ...................... 361/601; 361/605; 361/606; 361/622; 361/625; 361/659; 312/351.11; 312/351.12; 248/129
(58) Field of Search ................................ 361/625–631, 361/641–644, 659–661, 663, 665, 666; 312/351.11, 351.12, 351.13; 248/129; 324/110

(56) References Cited

U.S. PATENT DOCUMENTS

| | | | |
|---|---|---|---|
| 5,111,127 A | * | 5/1992 | Johnson .......................... 320/2 |
| 5,353,216 A | * | 10/1994 | Ayers et al. ................. 361/732 |
| 5,749,588 A | * | 5/1998 | Stallbaumer ............. 280/47.27 |
| 5,895,981 A | * | 4/1999 | Flegel .......................... 307/64 |
| 6,252,764 B1 | * | 6/2001 | Benson ........................ 361/625 |

* cited by examiner

Primary Examiner—Lynn D. Feild
Assistant Examiner—Boris L. Chervinsky
(74) Attorney, Agent, or Firm—John Lezdey

(57) ABSTRACT

An apparatus comprising a hand truck and a releasably attachable unit including an electric meter, a circuit breaker panel box and an electrical receptable which may be electrically coupled. The hand truck has a rectangular frame connected to a handle means for controlling its movement at the top end and at the other end a base plate that projects forwardly and a pair of braces that extend rearwardly from the frame. The pair of braces provide housing for a wheel assembly comprising heavy duty wheels on an axle. The braces and wheel assembly allow for facilitating movement over rough terrain and stairways. The apparatus includes a lockbar for security and to prevent movement. The apparatus can also include stabilizing means for preventing the apparatus from toppling when employed in an upright position,

9 Claims, 2 Drawing Sheets

PORTABLE ELECTRICAL DISTRIBUTING APPARATUS

FIELD OF THE INVENTION

The present invention relates generally to an apparatus for manually transporting an electrical distribution unit and more particularly to hand trucks carrying such units along with ancillary equipment.

DESCRIPTION of the PRIOR ART

In the construction industry electrical energy is required to power equipment and tools particularly at sites remote from a power sources and in areas where the terrain is difficult. The ground is often rough due to construction activity. Further, there may be stairways or other obstacles that make it difficult to move not only the required equipment and tools but also to provide a source of power at the site. In some instances the power demands of equipment and tools may overload the electrical supply circuit tripping the circuit breakers. This requires the circuit breaker to be reset. However, the power distribution source may be a distance from the work site. The downtime used in the resetting procedure obviously increases production costs. Therefore, a more efficient system which substantially departs from the conventional concepts and designs of the prior art is required.

SUMMARY OF THE INVENTION

The present invention provides an apparatus for carrying a portable electrical distribution unit. The apparatus includes a housing containing a rectangular frame having a first vertical frame support member coupled to each other by a plurality of cross-members spaced apart and parallel to each other. A rearwardly extending handle for controlling the movement of the apparatus is attached at the top end. A pair of heavy duty wheel means mounted on an axle and wheel assembly which also extends rearwardly is positioned at the bottom end. A base plate also is located at the bottom end projects forwardly from the vertical support members. The portable electrical distribution unit is attached to the cross-members. This unit comprises an electric meter within a meter housing electrically coupled to a circuit breaker panel box equipped with an electric outlet. For ease in moving the apparatus over a stairway, brace means extend rearwardly and upwardly from the vertical frame support members. These brace means slide over the edge of a step and are oriented to maintain the apparatus at a reasonably upward angle of inclination.

The apparatus also includes a means for locking which serves a two-fold purpose of providing security and to prevent the apparatus from toppling, for example, a bar or a U-shaped tubing.

DETAILED DESCRIPTION OF THE PREFERRED EMBODIMENTS

Figure 1:
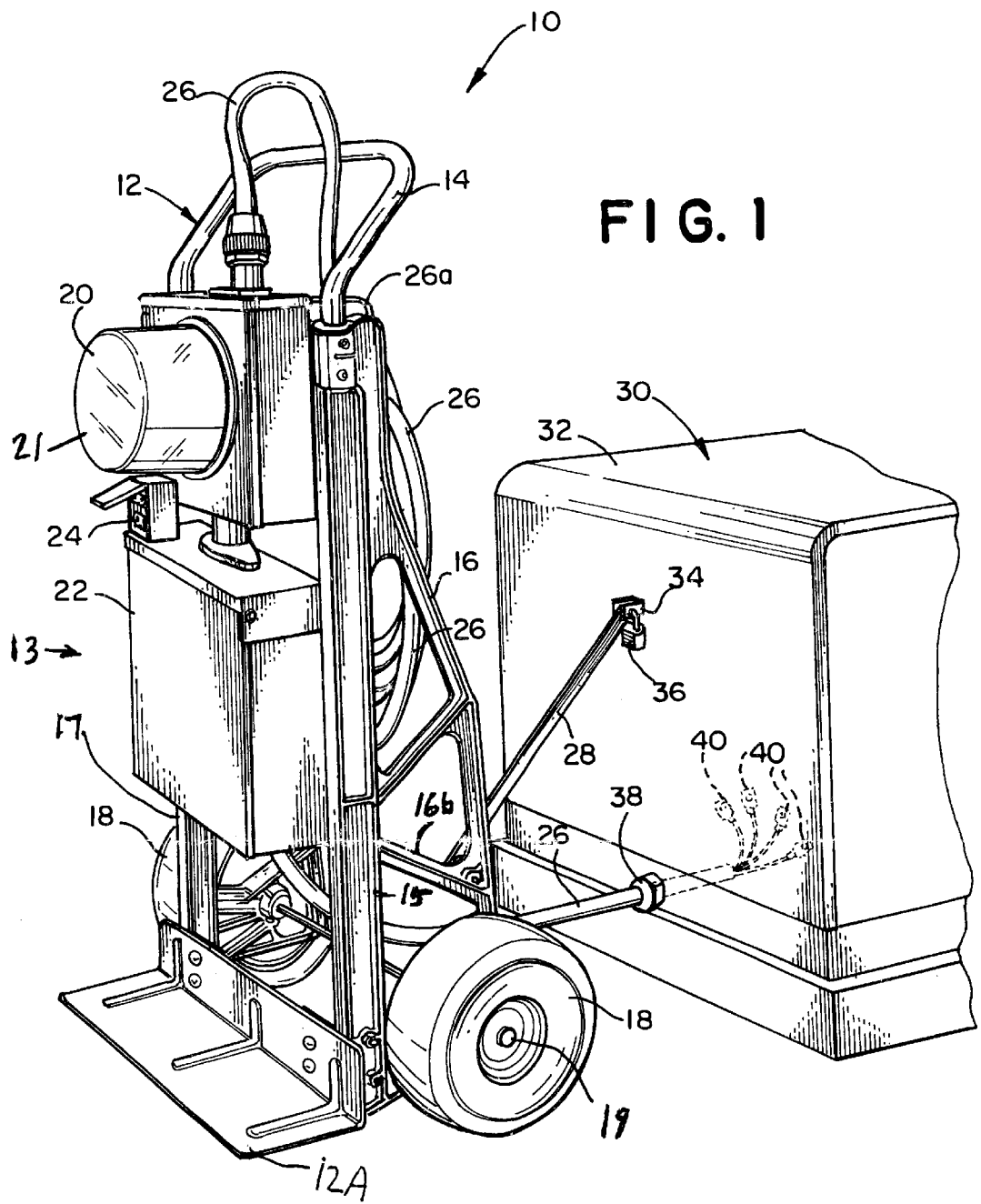
FIG. 1. is a perspective view of an apparatus embodying the present invention constructed in accordance with the present invention in a locked position and connected to a power source.
Figure 2:
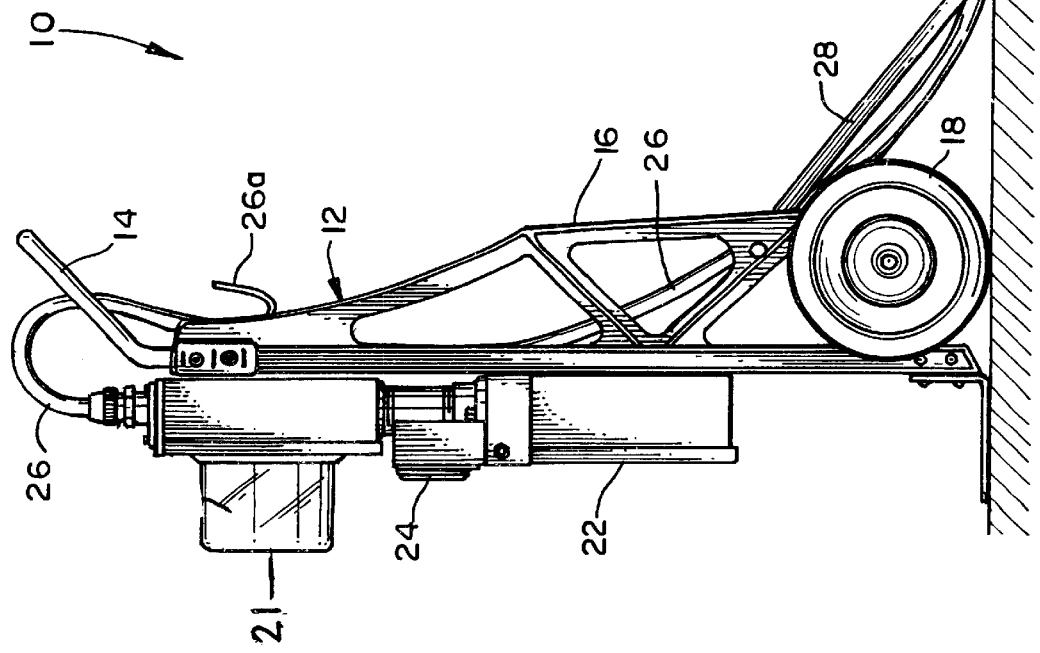
FIG. 2. is a side view of the apparatus of FIG. 1 in a position away from but still connected to the power source.

As shown in FIGS. 1 and 2 a portable electrical distribution apparatus is constructed in accordance with the present invention and is designated by the reference numeral 10.

The apparatus comprises a hand truck 12 and a releasably attachable electrical distribution means which includes a meter housing 20, an electric meter 21, a circuit breaker panel box 22, and an electrical receptacle 24, all of which may be electrically coupled.

Referring to FIGS. 1 and 2, the hand truck 12 includes a rectangular frame which comprises a first vertical frame support member 15 and a second vertical member support member 17 connected by a plurality of cross-members (not shown) which are spaced-apart and parallel to each other. The rectangular frame has at one end a handle 14 and at the other end a wheel assembly 18 comprising a pair of small heavy wheels and a forward projective base plate 12A.

The handle 14 is used for controlling the movement of the hand truck. The handle 14 may be an off-set U-shaped configuration as shown in the figures or it may have a pair of handgrips which are not connected. Such design and construction are well known in the art. A pair of parallel rigid braces 16 (only one fully shown) are mounted to the inside of each frame and extend rearwardly and upwardly when the hand truck is in a generally upright position. Upper portion (not shown) extends forwardly and joins frame numbers 15 and 17 at the top end of each frame member. Lower portion 16b inclines rearwardly at an angle in the range of about 20to 30 degrees relative to the frame member and provides an axle support means for a heavy duty wheel assembly 18. FIG. 1 shows an axle 19 extending through each brace 16 in which a wheel is rotatably mounted on each end of an axle 19. The configuration of the pair of braces allows the apparatus 10 to slide up and down stairs without inclining the hand truck to the extent that stability is compromised. the axle 19 may accommodate wheels of different dimensions including inflatable tires mounted on the wheels. The braces and wheel assembly of this invention allow for facilitating movement not only on stairways but also on rough terrain.

A base plate 12A is secured at right angles to frame members 15 and 17 and projects forwardly for balancing the hand truck in an upright position and for providing a platform for carrying a load. The rearward edge of the base plate 12A is forward of the wheel assembly 18 and below the axle 19. The axle is positioned so that when hand truck 11 is tilted back for normal movement the center of gravity of the hand truck will be generally above the axle. When in an upright position base plate 12A may carry a fixed or releasably attached box or boxes to provide places for storing parts and tools. Means for releasably attaching such containers may include clamps, mounting brackets, straps or other conventional fastening techniques known to those skilled in the art.

The hand truck 12 is typically constructed of steel or other suitable metals such as aluminum or of an engineering plastic. The components of the hand truck may be welded together or they may be assembled with mechanical fasteners, e.g., nuts and bolts as shown in FIGS. 1 and 2. The latter construction provides the additional features of assembly and disassembly when required. The apparatus is of a durable and reliable construction.

The releasably attachable electrical distribution unit 13 includes a housing for 20 an electric meter 21, a circuit breaker panel box 22 and an electrical outlet or receptacle 24. All the unit 13 components are commercially available. These components may be attached and connected individually to the hand truck. Preferable the components are connected together then attached as a unit to the hand truck. In practice the electric meter 21 is installed in the meter housing 20 and under the control of the local utility.

In FIG. 1 the apparatus 10 is shown in a stored position secured to a cabinet 30 housing a power source 32 by a lockbar 28 The lockbar is pivotedly mounted on the rear side of the pair of braces 16b at one end and having an opening at the other end for connection with a yoke 34 which is affixed to cabinet 32. The lockbar and yoke are secured with a locking means such as a padlock 36. Besides securing the apparatus 10, the lockbar prevents the handtruck from toppling. As shown in FIG. 1 the apparatus 10 also includes a heavy duty cable and wire 26 partially coiled around a hook shaped bracket or rung 26a attached to meter housing 20 connecting an electric meter 21 to a power source 30 located within cabinet 32. The cable and wire 26 are affixed to the cabinet by a weatherproof connector 38 and provide power to the electrical distribution unit 13 through electrical connectors 40. An electrical outlet 24 is attached and electrically connected through panel box 22.

FIG. 2 shows the apparatus 10 unlocked, positioned at the work site with the cable and wire 26 extended where electric and electronic equipment such as appliances, tools, pumps, office equipment may be connected to electrical outlet 24. In addition to providing electrical power on a desired site remote from the power source, the portable electrical distribution unit 13 of this invention allows for the following advantages. In the event of a circuit overload, apparatus allows for a quick assessment of the problem, e.g., defective tool and then permits the immediate resetting of the circuit breakers. This eliminates the need of a trip back to the power source, work is only momentarily interrupted and cost losses are minimal. Further, electrical usage and costs may be determined from actual readings from the meter.

The apparatus 10 may be used in a horizontal or upright position. When the apparatus 10 is in an upright position the lockbar may be replaced by an elongated U-shaped member positioned between and rotatably connected to the pair of braces. The elongated U-shaped member extends downwardly and rearwardly at a distance from the upright support members to contact the surface and assist the base plate and wheels to stabilize the apparatus.

In an embodiment particularly when the apparatus is used in an upright position, the vertical frame members may be modified to form a track to carry a slidably adjustable frame. The electrical distribution unit is releasably attached to the frame. This permits the electrical distribution unit to be raised to various heights, i.e. for use in staging or with scaffolding. The height adjustment may be made by aligning respective holes in the vertical frame members and the slidably adjustable frame and locking in the desired height by pins inserted in the aligned holes.

In addition to the upright position shown in FIGS. 1 and 2, the portable electrical supply unit may also be employed with the hand truck in a horizontal position. this position affords the better stability since support is provided by the wheels, braces and handle. To be most stable, the braces and the peripheral edge of should be co-planar.

A further optional feature to be used when the apparatus is in a horizontal position is to have the electric meter and circuit breaker panel box unit positioned on a swivel attached to the support members. The unit then may be pulled up and fixed into a vertical position in which the meter can be read and the electrical outlet readily accessible for use.

In operation, if used at a construction site by a tradesman such as a carpenter, the carpenter will place tools on the base plate 12A. The carpenter will then tilt the hand truck rearward on axle 19 and roll over rough ground and up and down stairways.

As to a further discussion of the manner of usage and operation of the present invention, the same should be apparent from the above description. With respect to the above description, it is to be realized that the optimum dimensional relationships for the parts of the invention to include variations in size, materials, shape, form, function and manner of use and assembly, are deemed readily apparent and obvious to one skilled in the art and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A portable electrical distribution apparatus for connection to a power source within a housing comprising:
   a) a rectangular frame comprising a first vertical support member having a first end and a second end vertical support member having a first end and a second end;
   b) a handle means for controlling the movement of the apparatus are fixedly attached to die first ends of the first and second vertical support members;
   c) a pair of parallel rigid braces having an upper portion and a lower portion said upper portion being connected to the first and second vertical support members and the lower portion to the second support members and the lower portion to the second end of the first and second vertical support members for stabilizing the apparatus in a horizontal position;
   d) a base plate is secured at right angles and projects forwardly from the second end of the first and second vertical support members;
   e) an electrical distribution unit attached to said frame in electrical communication with an electric meter within an electrical meter housing, a circuit breaker panel box and an electrical outlet, and;
   f) a lockbar pivotably connected to a brace and attached to said power source housing for stabilizing said apparatus.

2. The portable electrical distribution apparatus according to claim 1 wherein said electrical distribution unit is releasably attached to said frame.

3. The portable electrical distribution apparatus according to claim 1 wherein said electrical distribution unit additionally includes a hook-shaped bracket attached to the frame for holding and removeably securing a cable and wire.

4. The portable electrical distribution apparatus according to claim 1 wherein said pair of parallel rigid braces each have an upper portion extending forwardly and secured to the first ends of the first and second vertical support members, each have a lower portion inclining rearwardly with respect to the frame and connected to the second end of the first and second vertical support members and providing an axle support means for a heavy duty wheel assembly.

5. The portable electrical distribution apparatus according to claim 1 wherein said handle means is inclined rearwardly to the first ends of the first and second vertical support members.

6. The portable electrical distribution apparatus according to claim 1 additionally comprises a cable and wire for connecting said unit to an electrical power supply.

7. The portable electrical distribution apparatus according to claim 1 wherein the heavy duty wheel assembly comprises a pair of heavy-duty wheels having pneumatic tires.

8. The portable electrical distribution apparatus according to claim 1 wherein the peripheral edges of the handle and the peripheral edges of the pair of braces are coplanar.

9. A manually portable electrical distribution apparatus for connection to a power source within a housing comprising:

a) a rectangular frame comprising a first vertical support member with a first vertical support member having a first end and a second end and a second vertical support member having a first end and a second end;

b) a handle means for controlling the movement of the apparatus are fixedly attached and inclined rearwardly to the first ends of the first and second vertical support members;

c) a pair of parallel rigid braces each having an upper portion extending forwardly and secured to the first ends of the first and second vertical support members for supporting the apparatus in a horizontal position and each brace having a lower portion inclining rearwardly with respect to the frame and connected to the second end of the first and second vertical support members providing an axle support means for a heavy duty wheel assembly;

d) a base plate secured at right angles and projecting forwardly from the second end of the first and second vertical support members;

e) an electrical distribution unit attached to said frame comprising in electrical communication with an electric meter within an electrical meter housing, a circuit breaker panel box and an electrical outlet, and;

f) a lockbar pivotably connected to a brace and attachable to said power source housing for stabilization of said apparatus.

* * * * *